Sept. 9, 1969　　　H. PIEREN ETAL　　　3,466,098
ANTI-LOCK DEVICE FOR THE BRAKED WHEELS OF MOTOR VEHICLES
Filed Aug. 2, 1968

INVENTORS
HEINZ PIEREN And
ILIAS Toptani
By Jacobi & Davidson
Attorneys

# United States Patent Office 3,466,098
Patented Sept. 9, 1969

3,466,098
ANTI-LOCK DEVICE FOR THE BRAKED WHEELS OF MOTOR VEHICLES
Heinz Pieren, Frutigen, Switzerland, and Ilias Toptani, Johannesburg, Transvaal, Republic of South Africa, assignors to Topia SA, Fribourg, Fribourg, Switzerland
Filed Aug. 2, 1968, Ser. No. 749,821
Claims priority, application Switzerland, May 21, 1968, 7,528/68
Int. Cl. B60t 8/02, 13/18, 15/58
U.S. Cl. 303—21                                     7 Claims

ABSTRACT OF THE DISCLOSURE

At a predetermined brake-fluid pressure two slide valves shut off the secondary brake lines to the front and rear wheels from the primary brake lines to the brake master cylinder, and a piston is reciprocated in a chamber connected to the secondary lines so as cyclically to raise and lower the hydraulic pressure in these latter lines and momentarily to move alternately each slide valve to reconnect a primary and corresponding secondary line when the secondary-line hydraulic pressure is maximum.

Background of the invention

The invention relates to a unitary device for preventing braked motor-vehicle wheels from locking, wherein the brake fluid is free to flow, when the pressure in the primary brake line does not exceed a given value, from a primary brake line to a secondary brake line connected to one or more wheel cylinders, but is repeatedly prevented from so flowing by a valve when the pressure exceeds this value. A piston operates in a chamber continuously connected to the secondary line to rise and lower cyclically the hydraulic pressure therein, and thereby alternately to apply and release the wheel brake or brakes.

Anti-lock devices of this kind are known in the prior art and described, for example, in the United States patents, Numbers 2,270,586 and 3,231,315, but are of no practical significance because of various faults.

Summary of the invention

The purpose of the present invention is an improved anti-lock device, of the kind previously described, which avoids the faults of the prior-art devices and provides a high degree of motoring safety.

An object of the invention is an anti-lock device of the kind described, wherein said valve is a differential-force valve subject to the hydraulic pressure in the primary line and moved by a resultant differential force thereof, when the pressure approximately equals a given minimum value, against a calibrated resilient means to a position in which the primary line is closed off from the secondary line.

This object and others of the invention will be apparent from the following detailed description.

Brief description of the drawing

The invention will be described, with reference to the figures of the accompanying drawing, wherein.

Description of the preferred embodiment

Figure 2:
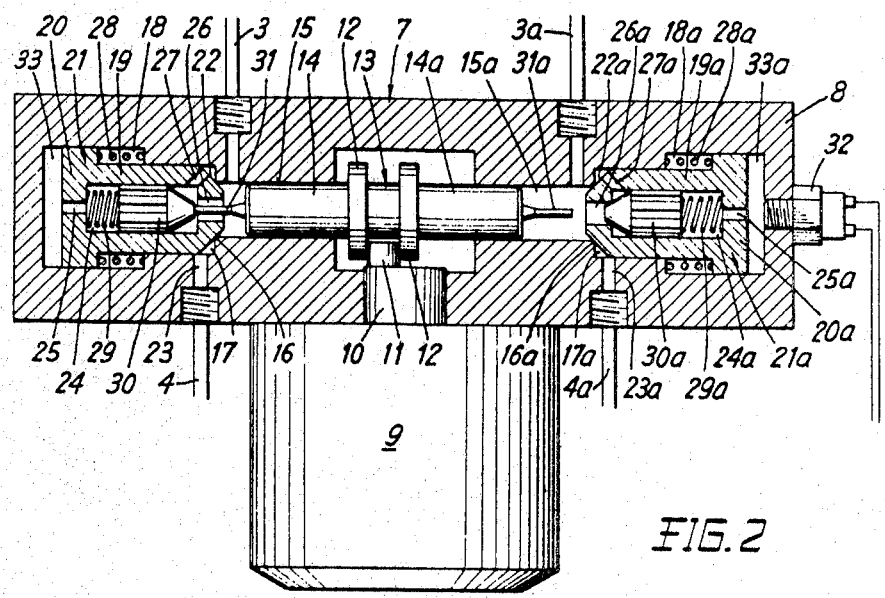
FIGURE 2 is a somewhat simplified side view, partly in cross section, of the device of the invention.
Figure 1:
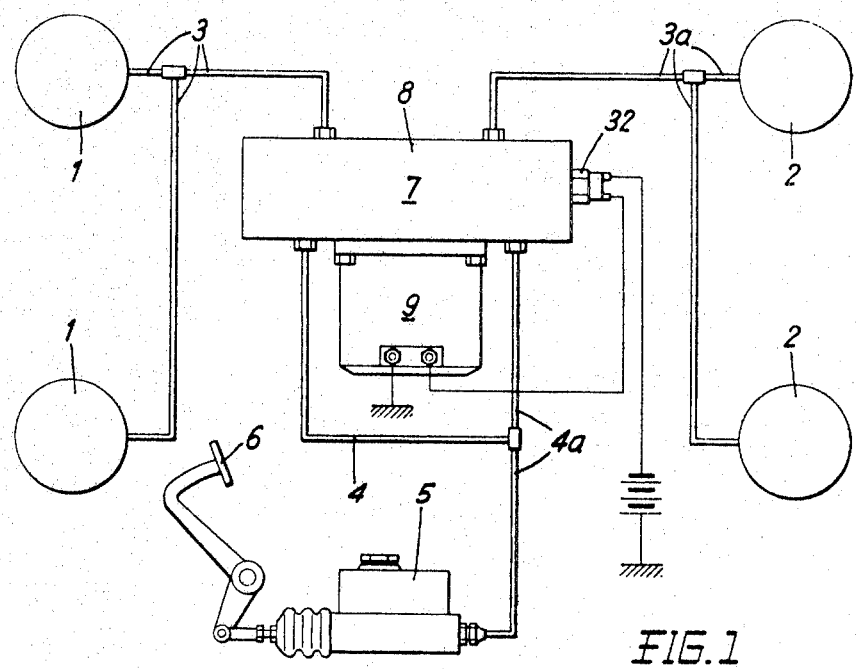
FIGURE 1 is a schematic view showing the way in which the device of the invention is connected into the braking system of a vehicle.

With reference to FIGURE 1, the front and rear wheel service brakes are given the reference numbers 1 and 2, respectively, their respective secondary brake lines the numbers 3 and 3a, and their respective primary brake lines 4 and 4a. The latter lines are connected to the usual brake master cylinder 5 with a brake pedal 6. In the case of a two circuit braking system, the primary brake lines can be separately connected to the master cylinder, which in this case, as in the previous one, can be a power brake master cylinder. The anti-lock unit 7 of the invention is connected between the primary and secondary brake lines, and is shown in greater detail in FIGURE 2.

The unit includes a housing 8 on one side of which is mounted an enclosed electric motor and gear unit 9, the gear unit having a high step-down ratio. The free end of the motor-and-gear-unit shaft 10 mounts an off-center pin 11, which engages between two spaced collars 12 of a piston 13, for the purpose of reciprocating the working parts 14 and 14a thereof in respective, mutually coaxial bores 15 and 15a. These bores, in turn, are each connected to a respective coaxial bore 17 and 17a, which latter are connected to still further coaxial bores 18 and 18a, respectively. The shoulders formed between the bores 15 and 17, on the one hand, and the bores 15a and 17a, on the other, are constructed as valve seats. The smaller and larger diameter sections 19 and 20, respectively, of a differential-force slide valve 21 slide in the respective bores 17 and 18. Similarly, the sections 19a and 20a of an identical differential-force slide valve 21a are free to slide in the respective bores 17a and 18a. Each differential-force slide valve 21 and 21a has a respective conical valve face 22 and 22a, which, when it bears against a respective valve seat 16 or 16a, cuts off the passage 23 or 23a, connected to the primary line 4 or 4a and leading to the bore 17 or 17a, from the bore 15 or 15a. Each slide valve incorporates a central cavity 24 or 24a, which has at each end a respective passage 25 and 26 or 25a and 26a that leads to the large and small ends, respectively, of the slide valve. Each valve also embodies a passage 27 or 27a that leads to the valve face 22 or 22a. Located with the bore 18 or 18a is a calibrated compression spring 28 or 28a which opposes movement of the slide valve towards the seat 16 or 16a. A relief valve 30 or 30a, located within the cavity 24 or 24a and biased by a compression spring 29 or 29a, closes off the passage 26 or 26a. The body of each valve 30 and 30a is grooved to connect together the passages 27 or 27a and 25 or 25a via the cavity 24 or 24a. The ends of the working parts 14 and 14a of the piston 13 have each a central, needle-shaped projection 31 or 31a, which, as will be explained, momentarily pushes the relief valve from its seat at the inner end of the passage 26 or 26a.

The end wall of the bore 18a embodies a threaded hole in which is mounted a commercially available electric switch 32 operated by the varying pressure in the adjoining space 33a. As shown in FIGURE 1, the switch is connected in the power supply circuit for the electric motor 9 and closes this circuit when then the pressure, in the space 33a (a similar pressure reigns in the space 33), of the brake fluid on the primary side reaches a predetermined, adjustable value, as a consequence of a corresponding pressure on the brake pedal 6.

The operation of the two differential-force slide valves 21 and 21a is the same, but, because of the reciprocating piston 13, shifted 180°, relative to each other, with respect to the rotation of the shaft 10; the following explanation holds true for both slide valves.

When the piston 13 is stationary—that is, when the brake pedal 6 is not pushed too hard—the slide valve 21 is not seated on the seat 16; the pressure in the bores 15 and 17 is transmitted via the passage 27, the cavity 24, and the passage 25 to the space 33. The differential hydraulic force acting on the slide valve 21, in consequence of the resultant force parallel to the direction of valve movement being greater for the outer end face than for the inner end face, is not sufficient to overcome the force of the calibrated spring 28 and to push the slide valve rightwards. The primary hydraulic pressure is transmitted through the secondary brake line 3 to the cylinder of the brake 1.

The spring 28 is so calibrated with respect to the adjustment of the switch 32 that the latter turns on the motor 9 approximately at that "critical" value of the hydraulic-brake-fluid pressure at which the slide valve face 22 seats on the seat 16, thereby closing the path between the bores 15 and 17 and thus between the primary and secondary brake lines. The bore 17, which lies on the primary side because it is connected to the primary line 4, remains connected to the space 33 via the passage 27, the cavity 24, and the passage 25. Thus, when the primary-side pressure exceeds the "critical" value, the slide valve is pressed more firmly against its seat 16.

As the piston 13 reciprocates, the working part 14, moving in the bore 15, alternately increases and decreases the amount of free space in the bore 15, and thus causes the secondary-side pressure to pulsate at some suitable rate, such as five times per second. The corresponding wheel brake is applied and released at the same frequency. At the left end of the piston stroke (for piston 13), when the secondary-side pressure is maximum, the projection 31 momentarily pushes the slide valve 30 off its seat, so that during this interval the free space of the primary-side bore 17 is connected via the passage 27, the cavity 24, and the passage 26 to the free-space of the secondary-side bore 15. In this way, the secondary-side brake pressure is brought up to that of the primary side, so as to ensure that braking pressures exceeding the "critical" value, as a result of pushing harder on the brake pedal, are transmitted to the wheel brakes.

It is apparent that when the pressure in the bore 15 and the secondary lines 3 is rising from its minimum to its maximum value, the pressure in the bore 15a and the lines 3a is falling from its maximum to its minimum value. The braking that thus results from the anti-lock device of the invention, wherein the wheel brakes at one end of the vehicle are being applied while those at the other end are being released, is safer and more agreeable. The invention has the further advantage that the force exerted by the pin 11 on the piston 13 needs be sufficient only to overcome the difference between the forces acting at any given moment on the working parts 14 and 14a. Thus, the torque required from the motor 9 is less than would be the case were there only one working part of the piston 13, one slide valve, etc.

As soon as the primary-side braking pressure falls below the "critical" value, the switch 32 shuts off the motor 9; and the springs 28 and 28a again push the respective differential-force slide valves 21 and 21a off their seats.

What is claimed is:

1. A device for use with service brakes for preventing brakes motor-vehicle wheels from locking, including a piston; a piston chamber in which said piston is free to reciprocate; a secondary brake line for supplying hydraulic fluid to the brake cylinder of at least one wheel, said line communicating at all times with a free space left in said piston chamber by said piston; at least one primary brake line connected at its one end to the brake master cylinder; means for reciprocating said piston when the primary-line hydraulic pressure approximately equals a predetermined minimum value for causing the hydraulic pressure in said secondary brake line to vary cyclically between a minimum value, when the piston is at the beginning of its stroke, and a maximum value, when the piston is at the end of its stroke, so as cyclically to apply and release at least one wheel brake; a further chamber opening into said piston chamber free space, the other end of said primary brake line being connected at all times to a free space within said further chamber; a valve movable in said further chamber between a first position in which said primary brake line communicates with, and a second position in which said primary line is cut off from, said secondary brake line; and wherein the improvement comprises that said valve is a differential-force valve acted upon by the primary-line hydraulic pressure so that there is produced a resultant differential force which moves said differential-force valve to said second position when the primary-line pressure equals said predetermined minimum value, and calibrated resilient means biasing said differential-force valve to said first position.

2. The anti-lock device as defined in claim 1, wherein said differential-force valve has first and second spaced end faces, each subjected to the same primary-line hydraulic pressure but the two faces together having exerted on them two mutually opposed forces of different magnitude, whereby the difference between the forces acting on said valve faces tends to urge said differential-force valve against said resilient means from said first to said second position and is sufficient, at said predetermined minimum value, to move said differential-force valve to said second position.

3. The anti-lock device as defined in claim 2, including a cavity within said differential-force valve for connecting at all times said further chamber free space and therefore said primary line to said cavity, said further chamber free space being defined by a part of said further chamber and one of said valve faces; a second passage embodied by said differential-force valve for connecting at all times said cavity to a further free space defined by a part of said further chamber and the other of said valve faces; a third passage embodied by said differential-force valve for permitting connection between said cavity and said piston-chamber free space; a further valve movable within said cavity; resilient means for biasing said further valve to a first position wherein said cavity is cut off from said third passage; and means associated with said piston for briefly moving said further valve from said first position so as to establish communication between said cavity and third passage and therefore between said cavity and said piston-chamber free space when said piston is at the end of its stroke.

4. The anti-lock device as defined in claim 3, wherein said valve third passage and means associated with said piston define a common axis for permitting the last-named means to enter said third passage and to operate said further valve, when said piston is at the end of its stroke.

5. The anti-lock device as defined in claim 3, including a valve seat incorporated between said piston-chamber and said further chamber for receiving that said valve face on which the lesser hydraulic force is exerted, and said first and third passages are associated with the last-named said valve face, and means incorporated by said further valve for providing a fluid connection at all times between all of the free space within said cavity.

6. The anti-lock device as defined in claim 3, wherein said piston-chamber defines two ends along an axis along which said piston reciprocates, and said piston defines two ends, each located opposite a respective said piston-chamber end; a pair of said piston-chamber free spaces, each located between a respective said piston-chamber end and piston end; a pair of said further chambers, each opening into a respective said piston-chamber free space; a pair of said differential-force valves, one for each said further chamber; a pair of said calibrated resilient means, one for each said differential-force valve; a pair of said further valves and resilient means therefor, one for each said valve cavity; and a said means associated with said piston for each said end thereof; and a pair of asid secondary brake lines connected to respective brake cylinders of separate wheels or pairs of wheels and communicating at all times with a respective said piston-chamber free space, whereby the hydraulic pressures in said two secondary brake lines cyclically vary 180° out of phase.

7. The anti-lock device as defined in claim 6, including a pair of said primary brake lines, each connected to a said free space in a different one of said pair of further chambers.

References Cited

UNITED STATES PATENTS

| | | | |
|---|---|---|---|
| 2,959,012 | 11/1960 | Johnson | 303—61 X |
| 3,231,315 | 1/1966 | Turnbull | 303—61 |
| 3,268,271 | 8/1966 | Yackle | 137—624.14 |
| 3,404,492 | 10/1968 | Smoren | 303—61 |

MILTON BUCHLER, Primary Examiner

JOHN J. McLAUGHLIN, Jr., Assistant Examiner

U.S. Cl. X.R.

303—6, 57, 59, 61, 69; 137—624.14